United States Patent [19]
Kikinis

[11] Patent Number: 6,055,566
[45] Date of Patent: Apr. 25, 2000

[54] CUSTOMIZABLE MEDIA PLAYER WITH ONLINE/OFFLINE CAPABILITIES

[75] Inventor: Dan Kikinis, Saratoga, Calif.

[73] Assignee: Lextron Systems, Inc., Saratoga, Calif.

[21] Appl. No.: 09/005,562

[22] Filed: Jan. 12, 1998

[51] Int. Cl.[7] .................................................. G06F 15/16
[52] U.S. Cl. ........................ 709/219; 709/218; 709/246
[58] Field of Search ..................... 395/200.47, 200.33, 395/200.67, 200.54, 200.36; 707/3, 6; 704/270; 709/217, 203, 237, 224, 206, 246, 218, 219; 705/34

[56] References Cited

U.S. PATENT DOCUMENTS

| | | | |
|---|---|---|---|
| 5,557,541 | 9/1996 | Schulhof et al. ................... | 709/219 X |
| 5,572,442 | 11/1996 | Schulhof et al. ...................... | 709/219 |
| 5,721,827 | 2/1998 | Logan et al. ............................ | 709/217 |
| 5,732,216 | 3/1998 | Logan et al. ............................ | 709/203 |
| 5,745,884 | 4/1998 | Carnegie et al. ......................... | 705/34 |
| 5,752,242 | 5/1998 | Havens ....................................... | 707/3 |
| 5,796,952 | 8/1998 | Davis et al. ............................... | 709/224 |
| 5,841,979 | 11/1998 | Schulhof et al. ........................ | 709/237 |
| 5,884,262 | 3/1999 | Wise et al. ............................... | 704/270 |
| 5,890,152 | 3/1999 | Rapaport et al. ......................... | 707/6 |
| 5,893,091 | 4/1999 | Hunt et al. ................................. | 707/3 |
| 5,926,624 | 7/1999 | Katz et al. ............................... | 709/217 |

OTHER PUBLICATIONS

Simon Arnfield, World Class Driven Synthesis of Prosodic Annotations, IEEE, Oct. 1996, pp. 1978–1980.

Michael H. O'Malley, Text–To–Speech Conversion Technology, IEEE, Aug. 1990, pp. 17–23.

*Primary Examiner*—Ahmad F. Matar
*Assistant Examiner*—Patrice Winder
*Attorney, Agent, or Firm*—Donald R. Boys; Central Coast Patent Agency

[57] ABSTRACT

An information dissemination system comprises an Internet-connected server adapted for gathering information from plural sources, and sorting the information according to subscriber preferences. The sorted information is transmitted via the Internet to a subscriber's Internet Appliance (IA) as electronic documents, where the documents are downloaded to a connected playback device. The playback device may be disconnected from the PC, and the information electronic documents rendered as speech to a speaker in the playback device by a text-to-speech system. In a preferred embodiment annotation is added at the Internet-connected server to control speech characteristics, such as inflection, upon playback. In some embodiments updates may be made by radio with the playback device disconnected from the IA.

16 Claims, 2 Drawing Sheets

CUSTOMIZABLE MEDIA PLAYER WITH ONLINE/OFFLINE CAPABILITIES

FIELD OF THE INVENTION

The present invention is in the area of delivery of data and information, such as news updates and information clipping services, and has particular application to apparatus and methods adapted for presenting such data and information to subscribers.

BACKGROUND OF THE INVENTION

Broadcasting organizations such as television broadcast companies and radio broadcast companies provide an enormous amount of data available to the public. For example, television broadcasts the news into millions of households several times a day. Radio stations broadcast throughout the day and night on a continuous basis. Anyone owning a television or radio receiver can tune into a wide variety of pre-planned programming at any time of day or night. In addition to these more traditional sources, the world-wide computer network known as the Internet now provides a new and expanding source of information for public access.

There are, however, several drawbacks to these sources for many people. One of the drawbacks of broadcast sources is related to the commercial nature of such sources. These systems are supported by advertising, and there is typically repeated interruption of information and data dissemination for advertising by the sponsors that support the programming.. Although some stations have become specialized such as offering only the news or offering only financial programming, most stations rely heavily on advertising sponsors. Most broadcast sporting events are also interrupted repeatedly in the same manner.

Another problem with conventional broadcasting is that generally content is designed to appeal to a large cross-section of people, and in and content may also change with events within an organization, such as change of ownership, and so forth. Also, some content may be entirely absent in some areas.

Still another limitation inherent to broadcasting has to do with range or reach of broadcast. For example, a typical radio station transmission range is limited to a purchased and localized territory with the transmitted information carried on a certain frequency or channel that is local to the community being serviced. When one travels beyond the boundary the frequency begins to carry the transmissions of another radio station that has license to broadcast on that frequency in that area, and so on. Similar boundaries exist with satellite services although on a much larger geographic scale.

The Internet, although quite different from broadcast sources, also has potential problems for many users. For example, a user has to know where to go on the Internet for specific sorts of information, and also must act with a PC or other computer appliance that is capable of connecting to and searching for information on the Internet There are Internet-based sources at the time of the present patent application that compile information and allow subscribers to specify categories and types of information desired, and then deliver the information on demand to the subscriber. In these systems data is typically delivered as readable text, and the sources are typically quite limited. The biggest drawback to these sources is the limitation to using computer appliances that are capable of dealing with the Internet.

What is clearly needed is an Internet-based system and method wherein customized (filtered per individual) digital information can be obtained from a wide variety of media sources, including sources local to subscribers, and delivered to a subscriber in a way that would eliminate traditional boundaries and limitations associated with conventional media services such as interruptions due to advertisement, geographic location of source media, and current state of the user (i.e. whether or not the user is traveling, using a stationary Internet-connected PC, etc.).

SUMMARY OF THE INVENTION

In a preferred embodiment of the present invention an information delivery system is provided, comprising an Internet-connected host server adapted to compile information from information sources and to deliver the information as text documents via the Internet; a subscriber's computer connected to the Internet and adapted to download the text documents from the Internet-connected server; and a playback unit connectable to the subscriber's computer by a data link. The playback unit is adapted to receive and store the text documents while connected to the subscriber's computer, and to render the text documents as speech on demand when not connected to the subscriber's computer.

In some embodiments the information is sent to the host server from the information sources as text over one or more data links. The text documents may be delivered from the information sources to the host server over the Internet. Also in preferred embodiments the host server is adapted to store subscriber preferences and to sort information for delivery to subscribers according to the preferences. The host server may also code text documents delivered to a subscriber in a manner to control audio characteristics including inflection as the text documents are rendered as speech in the playback unit. In still other embodiments there may be a radio broadcast system coupled to the host server and a radio receiving unit in the playback unit, the broadcast system and receiving unit adapted to update information according to subscriber preferences in the playback unit with the playback unit disconnected from the subscriber's computer. Dynamic preference updates are provided in some embodiments.

The playback unit in a preferred embodiment comprises a data port for connecting to a PC; a memory for storing text documents downloaded from the PC via the data port; a speaker; and a text-to-speech system adapted to open text documents downloaded from the PC, and to render the text documents as speech via the speaker. User inputs are provided for controlling selection of documents for playback, and start and stop functions for playback. In some embodiments the playback unit further comprises an LCD display adapted to display control functions for operating the playback unit. In addition the playback unit may have a display for displaying key information and for selection of control functions. The portable playback unit is preferably battery-powered and rechargeable.

BRIEF DESCRIPTION OF THE DRAWING FIGURES

DESCRIPTION OF THE PREFERRED EMBODIMENTS

Figure 1:
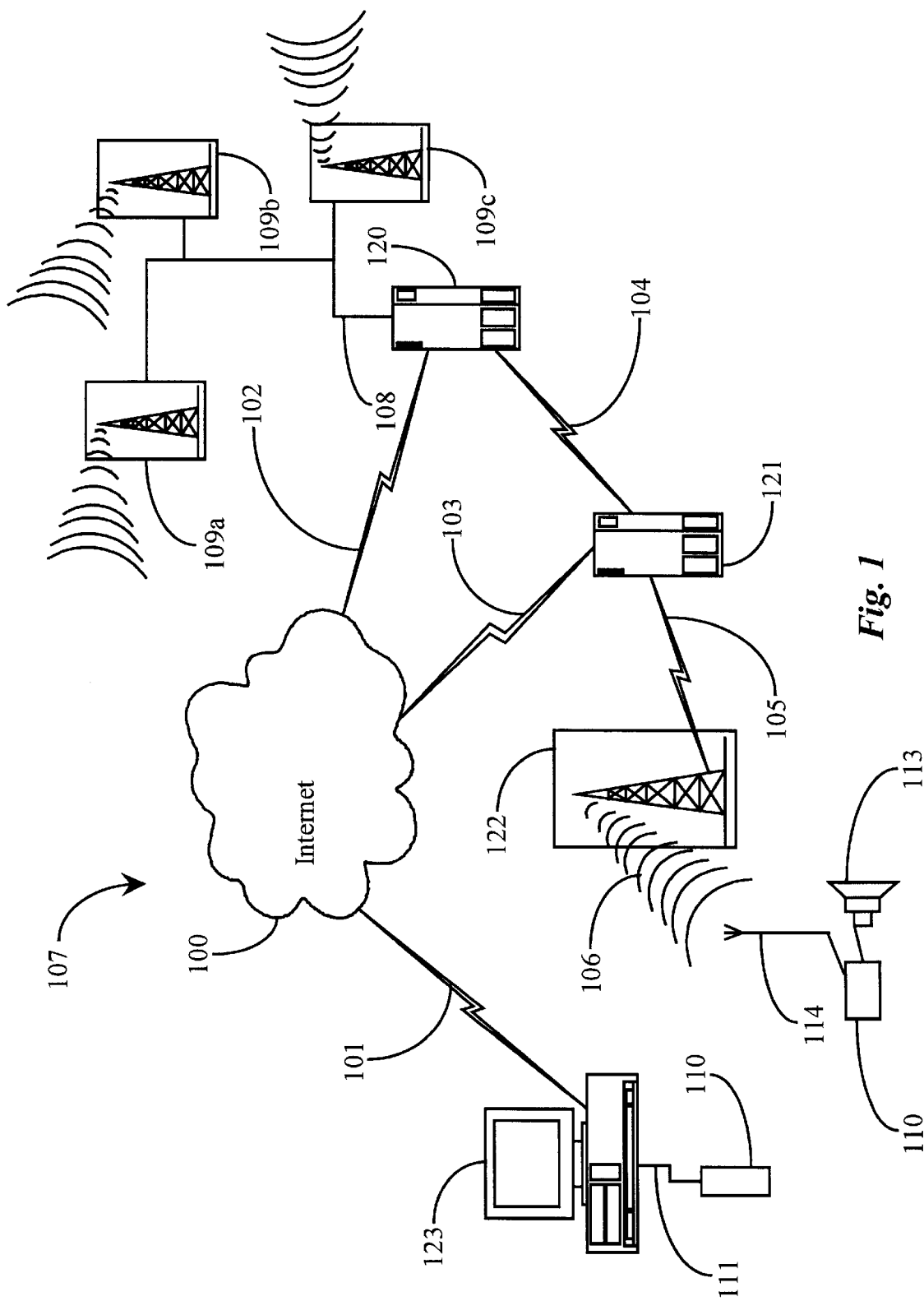
FIG. 1 is an overview diagram of an Internet-based media delivery system and presentation device according to an embodiment of the present invention.

FIG. 1 is an overview diagram of an Internet-based information gathering and delivery system 107 according to an embodiment of the present invention. In system 107 a playback device 10 is connected to a subscriber's PC 123 for the purpose of collecting information from the PC while connected. The PC shall be deemed only as an example of an Internet Appliance. Any other such device could be substituted for the PC. The same device may be disconnected from the PC and used for playing back to a subscriber the information collected from the PC while connected. The connection may be by any one of several methods, such as by a serial port cable 111 to PC 123, infrared, wireless etc.. Playback device 110 may also be adapted to reside in a cradle that can be part of PC 123 or connected to PC 123. The cradle (not shown) may also serve to recharge playback device 110 as well as to provide for downloading information to playback device 110. Playback device 110 plays back data that is downloaded, in this case from the Internet, and may be engaged at PC 123 or removed and carried away.

In the embodiment shown in FIG. 1, PC 123 is a subscriber's PC and has connection via a link 101 to the Internet represented by cloud 100. Line 101 may be plain old telephone service (POTS) or Internet Services Digital Network (ISDN), or any other link capable of Internet connection known in the art, including wireless connections.

Three media sources represented here as radio stations 109a, 109b, and 109c are connected to a host server 120 via a digital network 108. Sources of information in embodiments of the present invention may be quite varied, including TV as well as radio stations, and are limited only in that the sources need to be capable of providing information to server 120 in a form that the server may use. Digital network 108 is representative of any digital link by which suitable information may be transferred to server 120. For example each media source may have it's own Internet dial-up connection. Digital network 108 may be replicated along with host server 120 and provided or distributed to varying geographic regions to facilitate connection of smaller more localized media sources. It will be apparent to one with skill in the art that a wide variety of media sources may be used. In this embodiment radio stations are shown because of a wide variety of content available and because they are largely an untapped source for transmission of data over the Internet. Further, radio stations can provide local content not typically available with other services.

Following the example of radio stations as information sources for embodiments of the invention, in this case the service provider, operating host 120 contracts with the radio stations for provision of useful data. In most cases, a radio station receives information from their own sources (wire services, programming sources, and the like) in text form. This information is read by announcers. After the radio station uses the information, there is typically no further use for the information. The present invention provides a new and valuable use for such information; specifically, to be sold to the service provider in the present invention, sorted, and downloaded to subscriber's PCs to be loaded onto a device 110 to be later related to a subscriber.

In the embodiment shown each source 109a–c sends text information to server 120. Host server 120 is capable of organizing and sorting the information based on individual subscriber preferences stored in a database (not shown) accessible to host server 120. Each subscriber to the host's service provides preferences to the host to be used as filters for sorting information for the particular subscriber. The software filters are used by the service to decide what types or categories of information will be compiled for each individual subscriber. Filters in a preferred embodiment can be pre-set by each subscriber at the time of subscription and modified by the subscriber thereafter. For example, a subscriber that receives information from radio station 109a may elect to receive only certain portions of offered content such as stories pertaining to political events, but not stories pertaining to entertainment, and so on.

Media sources may include regional sources as well as local sources, as described above, as long as they have a network or Internet connection and a means to provide the data to a host server such as server 120. For example, if a subscriber resides on the west coast, then a list of sources that are near him could be provided for local content. Regional sources, as well as local sources in other locations or geographical points of interest to the subscriber, would also be available. By adding server capability to many strategic locations, a great number of media sources could be brought into play and made accessible to each subscriber. In fact, many hundreds of media sources covering many different locations could be made available for a subscriber's choice. Media sources providing content of a special interest can also be utilized. For example, local police activity and perhaps weather information normally available on a citizen-band radio can be offered, etc.

While playback device 110 is engaged in subscriber's PC 123, on a periodic basis filtered information from server 120 is transferred to the subscriber's PC via the Internet and downloaded to playback device 110. In a preferred embodiment this is set up to operate semi-transparently to the subscriber each time the subscriber connects to the Internet for any purpose. Such Internet connection schemes are known in the art and may be implemented by those with skill in the art without undue experimentation.

The primary purpose of playback device 110 is to store the filtered information provided by server 120, and to play this information to the subscriber at opportune times.

A subscriber will not typically monitor the downloaded information while the playback device is connected to his PC, although this "in-place" made may be used if desired. In a preferred use, a subscriber, when leaving his or her PC for a period of time will unplug the playback device a take it along. The subscriber may leave work and have a long drive home, or may just go to lunch, and so forth. The present invention in the embodiment described makes valuable use of this otherwise wasted transit time.

A playback device 110 is shown in FIG. 1 in the "unplugged" state, indicating a device that a subscriber has disengaged from the PC and carried away. The playback device has a speaker (or speakers) 113, and a text-to-speech system for converting stored text to speech. In one embodiment the device has a headphone jack so a subscriber may listen to the downloaded information without disturbing others or without being disturbed by outside noise sources. There is also a start-stop control interface so the subscriber may start and stop the playback at will. Now the subscriber may listen to the filtered and compiled information provided by the subscription service, transmitted to the subscriber's PC, and downloaded to the playback device while connected to the PC. The subscriber thus may make valuable use of transit time (or any other time the subscriber wishes to devote to the process).

As a very simple example, a subscriber may provide preferences for local weather, weather at a second location, and road and traffic conditions between the two points, including accident reports. The subscriber stores this information during the day, newer information replacing older information during passage of time, and then takes the playback device when starting home. The playback information is very useful to maximize travel efficiency and safety for the trip home. It will readily be seen that there are a multitude of similar uses for such a system.

Text to speech synthesizers are well known in the art, and may implemented in such a device as playback unit 110 without undue experimentation. The text to speech capability also provides a convenience not available to a person who simply tunes his radio to a local station. That is that the user of the playback device may replay information not fully understood at the first pass.

In a unique improvement to the text to speech capability, in one embodiment coding is provided with the text indicating inflection and other speech enhancement to improve the otherwise monotone quality of most text to speech renditions. Such coding enhancement may be provided at server 120 and software in the playback device recognizes the code and provides suitable alteration of the audio renditions. Other types of electronic files may also be sent, that are suitable for playing an extended multimedia device. There may also be a combination of voice/data or video/data files, for example.

In a further enhancement of the system and the playback device, there is an antenna 114 associated with playback device 110. In a preferred embodiment the antenna is removable. Now in a removed state, playback device 110b can be used in the field and further has the capability of receiving updates from a wireless transmitter 122 via a broadcast signal 106. Broadcast signal 106 may be customized or tailored to the individual subscriber via methods known in the art of wireless transmission such as addressing techniques, encryption keys and so on, including logging on of the wireless device. For example, to provide the subscriber with a level of privacy, an encryption key may be downloaded to playback device 110a in anticipation of receiving the updates in the field after it is removed from the subscriber's computer.

Wireless transmitter 122 is connected to an update server 121 via a digital connection 105. Update server 121 is dedicated to providing updates of information to those subscribers who are out in the field. This arrangement assumes that when a subscriber is using playback device 110 in the field, a method for the determination of that particular state is known to host server 120. This may be accomplished, in one embodiment, by a signal sent to host server 120 from playback device 110 via wireless transmitter 122 through digital connection 105 to update server 121, and through digital connection 104. In another embodiment, playback device 110 has the capability of connecting to the Internet in much the same way as an Internet-capable cellular phone using wireless technology. In yet another embodiment, a brief connection to the Internet is made from PC 123 when playback device 110 disengaged and a code is sent to host server 120 indicating that the subscriber is now in the field. Similarly, a code could be sent again when the subscriber reconnects playback device 110 to PC 123 indicating that playback device 110a is no longer in the field. In still another embodiment, up-dates may be sent simultaneously via the Internet and wireless transmission to subscribers regardless of whether or not they are in the field. It will be apparent to one with skill in the art that there are many different possibilities regarding the receiving of updated information to playback device 110 without departing from the spirit and scope of the present invention, many of which have already been described.

Figure 2:
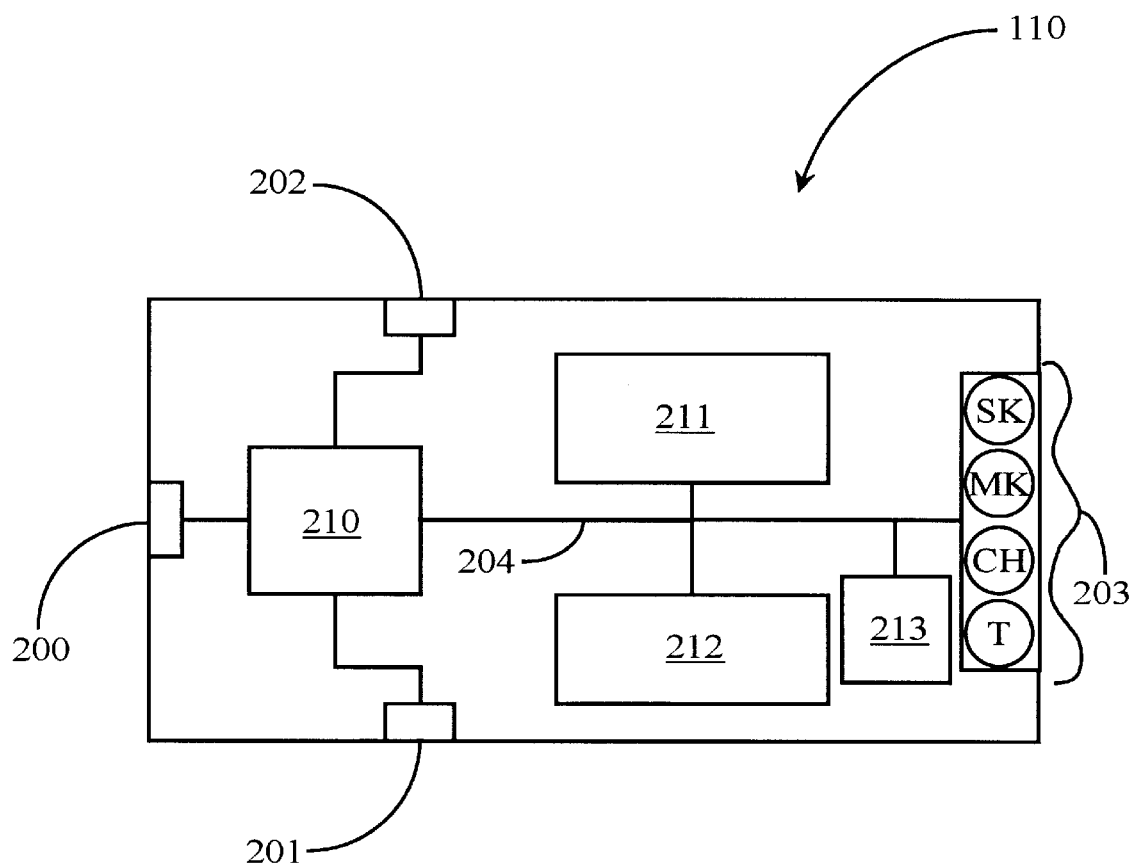
FIG. 2 is a block diagram of the presentation device of FIG. 1 according to an embodiment of the present invention.

FIG. 2 is a block diagram of playback device 110 of FIG. 1 according to an embodiment of the present invention. A port 200 is provided for the purpose of connecting playback device 110 to PC 123 of FIG. 1. Any suitable connection method may be used such as a serial port connection as described with reference to FIG. 1.

An integrated microcontroller 210 is connected via internal bus 204 to a headset port 202 and an antenna port 201. Microcontroller 210 includes all of the CODEC and radio circuitry necessary to communicate with these ports, and such circuitry is well-known in the art. Ports 202 and 201 are input-output (I/O) ports commonly used in the art. Flash memory modules 211 and 212 are connected to internal bus 204. Flash memory modules 211 and 212 may be permanently installed modules or removable modules such as well-known memory cards. In a preferred embodiment flash memory is used, however, other types of non-volatile memory may be substituted or used in combination with flash memory.

Playback device 110 may be powered in a number of different ways known in the art. In a preferred embodiment of the present invention, a rechargeable battery is used. In another embodiment, a cradle or station (not shown) may be provided for stationing and connecting playback device 110 to PC 123 with power provided from the host. A combination of power source may also be used with power coming from the host while playback device 110a is stationed and battery power taking over when removed from PC 123, etc. There are many methods known in the art for providing power to computer peripherals.

A cradle adapted for stationing playback device 110, as described above, in various embodiments serves several purposes. For example, a battery charging unit may be installed in such a cradle so that playback device 110 may be charged while not in use. In one embodiment, the cradle could be removable with an attachment adapted to being plugged into another power source such as a car cigarette lighter jack, or a car stereo cassette player, etc. In yet another embodiment, a stationary cradle may have it's own memory and circuitry allowing it to interact with host server 120 of FIG. 1 so that information can be downloaded independent of playback device 110 and then transferred to playback device 110a when interfaced.

A button panel 203 comprises four buttons and is connected by I/O circuitry to internal bus 204. These four buttons from top to bottom are marked SK (skip), MK (mark), CH (channel), and T (topic). Buttons on panel 203 are used to control media presentation and to send filter modifications to host server 120 of FIG. 1. For example, button SK is used to send a filter indicating that the particular content presented was skipped by the subscriber so that similar content should not be included in future presentations. Button MK is used to send a filter indicating that the particular content presented was marked by the subscriber so that similar content should be included in future presentations. In a preferred embodiment of the present invention, more detailed filter editing can be performed by a subscriber at a web site designed for that purpose. Button CH is a channel selector button and button T is a topic selector button to be used within a channel. The purpose of providing selector buttons to player device 110 serves to allow a subscriber to select which content will be played first and so on. It will be apparent to one with skill in the art that additional buttons providing more features can be added without departing from the spirit and scope of the present invention such as a button that would allow a subscriber to skip content without sending a filter modification, and so on, and controls for replaying portions of presentations In one embodiment a liquid crystal display (LCD) 213 is provided and connected to internal bus 204 through a display driver for the purpose of allowing a subscriber to view content such as the channel selected, status information regarding wireless updates and so on, as well as multimedia files. It will be apparent to one with skill in the art that other display technologies can be substituted, without departing from the spirit of the invention. In one embodiment, certain material may be displayed graphically. In another embodiment, financial information, sports scores and the like may be flashed on LCD 213 while playback device 110 is in use. It will be apparent to one with skill in the art that various features and capabilities could be added to playback device 110 without departing from the spirit and scope of the present invention. For example, in one embodiment, an E-mail client could be used to download E-mail from the Internet while in the field. In another embodiment, a video client could be used to view video clips on LCD 213, and so on.

It will be apparent to one with skill in the art that software control routines written for various embodiments of the present invention may be proprietary applications created by a hosting company or similar application standards known in the art without departing from the spirit and scope of the present invention. It will also be apparent to one with skill in the art that the method and apparatus of the present invention can be practiced on any wide area network (WAN) such as an X.25 proprietary data network, etc.

There are many possible embodiments in which the method and apparatus of the present invention may be practiced such as the application of FIG. 1 wherein playback device 110 is used in conjunction with the Internet. In another embodiment, playback device 110 could be adapted for use on a corporate network or a local area network. Similarly, features and capabilities may be added to playback device 110 without departing from the spirit and scope of the present invention such as e-mail capacity and the like. The spirit and scope of the present invention is limited only by the claims that follow.

What is claimed is:

1. An information delivery system comprising:
   an Internet-connected host server compiling information from information sources, storing subscriber preferences and sorting information, adjusting stored subscriber preferences according to subscriber use patterns and delivering the information as text documents via the Internet;
   a subscriber's Internet Appliance (IA) connected to the Internet and adapted to download the text documents from the Internet-connected server;
   a playback unit connectable to the subscriber's IA by a data link; and
   a radio broadcast system coupled to the host server and a radio receiving unit in the playback unit;
   wherein the playback unit receives and stores the text documents while connected to the subscriber's IA, and renders the text documents as speech on demand when not connected to the subscriber's IA, and the broadcast system and receiving unit updates information according to subscriber preferences in the playback unit with the playback unit disconnected from the subscriber's IA.

2. The information delivery system of claim 1 wherein the information is sent to the host server from the information sources over one or more data links.

3. The information delivery system of claim 2 wherein the text documents are delivered from the information sources to the host server over the Internet.

4. The information delivery system of claim 1 wherein the host server is adapted to code text documents delivered to a subscriber in a manner to control audio characteristics including inflection as the text documents are rendered as speech in the playback unit.

5. The information delivery system of claim 1 wherein the host server is adapted to adjust stored subscriber preferences according to subscriber use patterns.

6. A portable playback unit comprising:
   a data port for connecting to an Internet Appliance (IA) having downloaded text documents from an internet connected host server;
   a memory for storing text documents downloaded from the IA via the data port;
   a speaker; and
   a radio antenna and receiving circuitry capable of receiving radio broadcast from the host server; and
   a text-to-speech system adapted to open text documents downloaded from the IA, and to render the electronic documents as speech via the speaker;
   wherein the portable playback unit downloads text documents when connected to the IA, and also downloads text documents via the host server when not connected to the IA via the receiving circuitry.

7. The portable playback unit of claim 6 comprising user inputs for controlling selection of documents for playback, and start and stop functions for playback.

8. The portable playback unit of claim 6 further comprising an LCD display adapted to display control functions for operating the playback unit.

9. The portable playback unit of claim 6 further comprising a battery and recharge circuitry, the battery adapted to provide electrical power to the playback unit disconnected from the IA and the recharge circuit adapted to recharge the battery with the unit connected to the IA.

10. A method for providing filtered information to a subscriber, comprising steps of:
    (a) collecting information at an Internet-connected server from plural information sources;
    (b) sorting the information according to stored subscriber preferences, adjusting stored subscriber preferences according to a subscriber's usage patterns;
    (c) sending information sorted for a specific subscriber as text documents to that subscriber's Internet Appliance (IA) via the Internet;
    (d) downloading the text documents from the subscriber's IA to a connected playback device;
    (e) disconnecting the playback device from the IA;
    (f) sending text document updates from the Internet-connected server by a radio broadcast system coupled to the host server and a radio receiving unit in the playback device, the broadcast system and receiving unit updating information in the playback unit with the playback unit disconnected from the subscriber's IA according to stored subscriber preferences, adjusting the stored preferences according to the subscriber's usage patterns; and
    (g) playing back the text documents to a speaker at the playback device by a text-to-speech system.

11. The method of claim 10 further comprising a step for coding the text in an electronic document at the Internet-connected server in a manner to control speech characteristics, including inflection, during text-to-speech rendition at the playback device.

12. An information delivery system comprising:

an Internet-connected host server having a radio broadcast system adapted to compile information from information sources and deliver the information as text documents via the Internet;

a subscriber's Internet Appliance (IA) connected to the Internet and adapted to download the text documents from the Internet-connected host server; and a playback unit having a radio receiving unit also connectable to the subscriber's IA by a data link, wherein the IA sends a code to the host server via the internet when the playback unit is disengaged from the IA indicating that the subscriber is now in the field and a code is sent to the host server when the playback device reconnects, the playback unit receives and stores the electronic documents while connected to the subscriber's computer, and when disengaged, the host server sends updates to the playback unit via the radio broadcast system, and the playback unit renders the electronic documents as speech on demand when not connected to the subscriber's computer.

13. The information delivery system of claim 12 wherein the information is sent to the host server from the information sources over one or more data links.

14. The information delivery system of claim 13 wherein the electronic documents are delivered from the information sources to the host server over the Internet.

15. The information delivery system of claim 12 wherein the host server is adapted to store subscriber preferences and to sort information for delivery to subscribers according to the preferences.

16. The information delivery system of claim 12 wherein the host server is adapted to code electronic documents delivered to a subscriber in a manner to control audio characteristics including inflection as the text documents are rendered as speech in the playback unit.

* * * * *